United States Patent
Matsumoto et al.

(10) Patent No.: US 10,183,370 B2
(45) Date of Patent: Jan. 22, 2019

(54) CONSTANT TEMPERATURE WATER SUPPLY SYSTEM

(71) Applicant: DISCO CORPORATION, Tokyo (JP)

(72) Inventors: Tadaomi Matsumoto, Tokyo (JP); Masaru Saito, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 15/601,360

(22) Filed: May 22, 2017

(65) Prior Publication Data

US 2017/0341198 A1 Nov. 30, 2017

(30) Foreign Application Priority Data

May 30, 2016 (JP) .................................. 2016-107561

(51) Int. Cl.
*B23Q 11/14* (2006.01)
*G01K 3/08* (2006.01)
*B23Q 11/12* (2006.01)

(52) U.S. Cl.
CPC .............. *B23Q 11/141* (2013.01); *G01K 3/08* (2013.01); *B23Q 11/126* (2013.01)

(58) Field of Classification Search
CPC ..... B23Q 11/14; B23Q 11/126; B23Q 11/127; B23Q 11/128; B23Q 11/141; B23Q 11/143; B23Q 11/146; G01K 3/08; G05D 23/1919; G05D 23/1393; G05D 23/1931
See application file for complete search history.

(56) References Cited

U.S. PATENT DOCUMENTS

| 5,476,137 | A | * | 12/1995 | Ochiai | ................. | B23Q 11/141 165/206 |
| 7,845,308 | B1 | * | 12/2010 | Corneille | ............ | C23C 18/1632 118/429 |
| 2003/0079485 | A1 | * | 5/2003 | Nakata | ................. | B23Q 11/141 62/185 |

FOREIGN PATENT DOCUMENTS

JP 2007-127343 5/2007

* cited by examiner

*Primary Examiner* — Jonathan Bradford
(74) *Attorney, Agent, or Firm* — Greer Burns & Crain, Ltd.

(57) ABSTRACT

A constant temperature water supply system that adjusts water from a water supply source to a constant temperature by a constant temperature water supply apparatus and supplies the water to a processing apparatus. The constant temperature water supply apparatus is provided with water temperature adjusting units that adjust processing water and cooling water to predetermined temperatures and temperature adjustment control units that reset predetermined temperatures of the water temperature adjusting units. The processing apparatus is provided with water temperature detectors that detect the water temperatures of the processing water and the cooling water and water temperature managing units that each calculate the temperature difference between the water temperature detected by the water temperature detector and a desired temperature set in advance.

12 Claims, 3 Drawing Sheets

CONSTANT TEMPERATURE WATER SUPPLY SYSTEM

BACKGROUND OF THE INVENTION

Field of the Invention

The present invention relates to a constant temperature water supply system that adjusts water from a water supply source to a constant temperature and supplies the water to a processing apparatus.

Description of the Related Art

In general, in the processing apparatus such as grinding apparatus and cutting apparatus, the water temperatures of processing water, cooling water for a spindle, and so forth are managed to constant temperatures. By supply of the processing water and the cooling water at the constant temperatures, the deterioration of the processing accuracy due to thermal expansion and thermal contraction of machine parts and damage to the apparatus itself due to contact between parts like seizure of the spindle are prevented. As a related art, a constant temperature water supply system in which water supplied to the processing apparatus is kept at a constant temperature by a constant temperature water supply apparatus is known (for example, refer to Japanese Patent Laid-Open No. 2007-127343). In the constant temperature water supply system, a temperature adjuster is provided in the middle of a flow path that leads to the processing apparatus from a reservoir tank and water adjusted to a constant temperature by the temperature adjuster is supplied to the processing apparatus.

SUMMARY OF THE INVENTION

Meanwhile, in the constant temperature water supply system, the constant temperature water supply apparatus and the processing apparatus are not necessarily installed on the same floor. Thus, when the installation places of the constant temperature water supply apparatus and the processing apparatus are distant, water is affected by external factors such as the use environment while flowing from the constant temperature water supply apparatus toward the processing apparatus, so that the temperature of the water changes in a pipe. For this reason, there is the following problem. Specifically, even when processing water and cooling water adjusted to desired temperatures by the constant temperature water supply apparatus are supplied to the processing apparatus, the water temperatures have changed by several degrees or more when the processing water and the cooling water are supplied to the processing apparatus and it is impossible to carry out injection from an injection nozzle and cooling of the processing apparatus at the desired temperatures.

Therefore, an object of the present invention is to provide a constant temperature water supply system that can suppress variation in the water temperature due to external factors and supply water at a desired temperature to the processing apparatus.

In accordance with an aspect of the present invention, there is provided a constant temperature water supply system including a constant temperature water supply apparatus that adjusts water supplied from a water supply source to a predetermined temperature and supplies the water, a processing apparatus that uses the water supplied from the constant temperature water supply apparatus, and control means for controlling the constant temperature water supply apparatus in such a manner that the temperature of the water to be used in the processing apparatus becomes a desired temperature. The constant temperature water supply apparatus includes a reservoir tank that stores the water that is supplied from the water supply source and is to be used in the processing apparatus, a delivery pump that is disposed on a flow path that leads to the processing apparatus from the reservoir tank and sends the water to the processing apparatus, and water temperature adjusting means disposed downstream relative to the delivery pump on the flow path for adjusting the water temperature to a predetermined temperature T. The processing apparatus has water temperature detecting means for detecting the water temperature of the water supplied into the processing apparatus. The control means includes a water temperature managing unit that receives a water temperature T0 detected by the water temperature detecting means in the processing apparatus and calculates a difference $\Delta = T1 - T0$ from a desired temperature T1 stored in advance, and a temperature adjustment control unit that receives information on the difference $\Delta$ calculated in the water temperature managing unit and adds the difference $\Delta$ to the predetermined temperature T of the water temperature adjusting means of the constant temperature water supply apparatus to reset the predetermined temperature T. The water is supplied into the processing apparatus at the desired temperature.

According to this configuration, the temperature difference between the water temperature detected in the processing apparatus and the desired temperature is fed back to the constant temperature water supply apparatus and the predetermined temperature that reflects the temperature difference is reset in the constant temperature water supply apparatus. Specifically, the setting error of the predetermined temperature in the use environment in which the constant temperature water supply apparatus is installed is corrected based on the temperature difference between the water temperature detected in the use environment in which the processing apparatus is installed and the desired temperature. The water temperature is adjusted to the predetermined temperature after the resetting in the constant temperature water supply apparatus and thereby the water temperature changes from the predetermined temperature to the desired temperature of the processing apparatus while the water is supplied from the constant temperature water supply apparatus to the processing apparatus. Thus, the water at the desired temperature can be supplied to the processing apparatus even when the water temperature changes due to external factors and so forth while the water is supplied from the constant temperature water supply apparatus to the processing apparatus.

Preferably, in the constant temperature water supply system of the present invention, the water temperature managing unit of the control means is disposed in the processing apparatus and the information on the difference $\Delta$ is transmitted from the water temperature managing unit to the temperature adjustment control unit of the constant temperature water supply apparatus by wireless or wired communication means.

Preferably, in the constant temperature water supply system of the present invention, the water temperature managing unit of the control means is disposed in the constant temperature water supply apparatus and information on the water temperature T0 is transmitted from the water temperature detecting means in the processing apparatus to the water temperature managing unit in the constant temperature water supply apparatus by wireless or wired communication means.

According to the present invention, by feeding back the temperature difference between the water temperature detected in the processing apparatus and the desired temperature to the constant temperature water supply apparatus and adjusting the temperature, variation in the water temperature due to external factors can be suppressed and the water at the desired temperature can be supplied from the constant temperature water supply apparatus to the processing apparatus.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
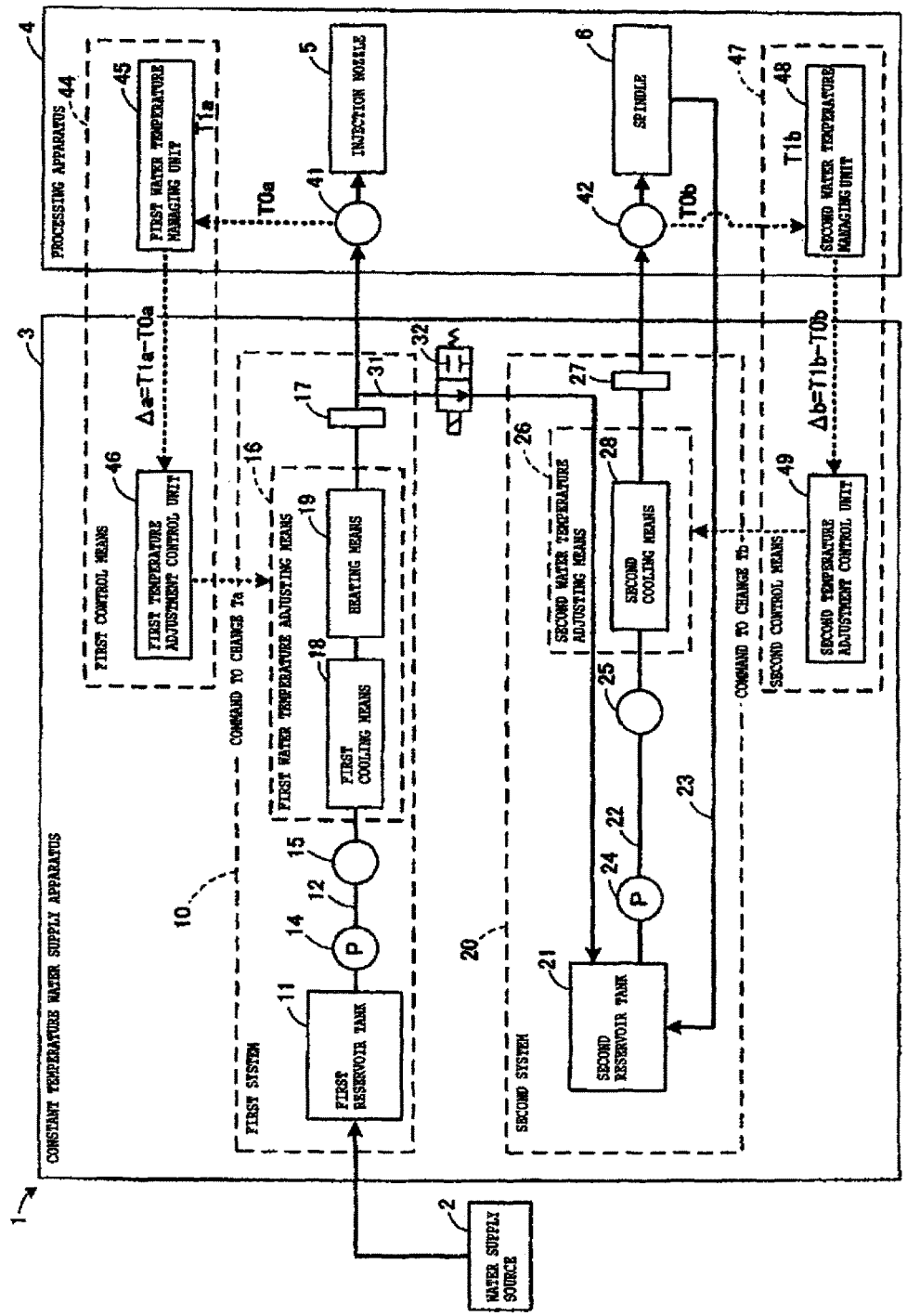
FIG. 1 is a schematic diagram of a constant temperature water supply system of the present embodiment.

A constant temperature water supply system of the present embodiment will be described below with reference to the accompanying drawings. FIG. 1 is a schematic diagram of the constant temperature water supply system of the present embodiment. Although the constant temperature water supply system including a cutting apparatus as processing apparatus will be exemplified in the following description, the present invention is not limited to this configuration. It suffices for the processing apparatus to be a configuration that uses water supplied from the constant temperature water supply apparatus. For example, the processing apparatus may be another kind of processing apparatus for grinding or the like.

As shown in FIG. 1, a constant temperature water supply system 1 is a system that adjusts water from a water supply source 2 to a constant temperature by a constant temperature water supply apparatus 3 and supplies the water to a processing apparatus 4. The constant temperature water supply system 1 includes a first system 10 that supplies processing water (water for processing) and a second system 20 that supplies cooling water (water for cooling). In the first system 10, the processing water is injected from an injection nozzle 5 of the processing apparatus 4 and a processed place is cooled and cleaned. The processing water after the supply is drained to the outside through a water case (not shown) or the like of the processing apparatus 4. The processing water is also sprayed onto works of the processing target and so forth and therefore is adjusted to a desired temperature so that influence may be prevented from arising in the processing accuracy.

In the second system 20, the cooling water is supplied to a water jacket (not shown) or the like in a spindle 6 and a spindle shaft is cooled. It suffices for the cooling water to cool the spindle shaft. Thus, purity and temperature adjustment like those of the processing water are unnecessary and the cooling water is circulated between the constant temperature water supply apparatus 3 and the processing apparatus 4. As above, when the processing apparatus 4 is operating, water from the water supply source 2 continues to be supplied to the processing apparatus 4 through the first system 10. In addition, the water is circulated in the second system 20 to continue to cool frictional heat of the spindle 6. A chuck table (not shown) may be cooled in the second system 20 in addition to the spindle 6.

In the first system 10, a first flow path 12 that leads to the processing apparatus 4 from a first reservoir tank (reservoir tank) 11 is provided. On the first flow path 12, the first reservoir tank 11 of the constant temperature water supply apparatus 3, a first delivery pump (delivery pump) 14, first pressure detecting means 15, first water temperature adjusting means 16, and a first filter 17 are provided sequentially from the upstream side toward the downstream side. The processing water supplied from the water supply source 2 is stored in the first reservoir tank 11 and the water in the first reservoir tank 11 is sent from the first reservoir tank 11 toward the injection nozzle 5 of the processing apparatus 4 by the first delivery pump 14.

The delivery pressure of the first delivery pump 14 is detected by the first pressure detecting means 15 and the delivery pressure of the first delivery pump 14 is adjusted according to the detection result of the first pressure detecting means 15. On the downstream side of the first delivery pump 14 on the first flow path 12, the water temperature is adjusted to a predetermined temperature by the first water temperature adjusting means 16. The first water temperature adjusting means 16 (adjuster) includes first cooling means 18 such as a chiller unit and heating means 19 such as a heater and the water is adjusted to the predetermined temperature by combining cooling by the first cooling means 18 and heating by the heating means 19. The water whose temperature has become the predetermined temperature passes through the first filter 17 to be supplied toward the processing apparatus 4 as the processing water.

In the second system 20, a second flow path 22 that leads to the spindle 6 of the processing apparatus 4 from a second reservoir tank (reservoir tank) 21 and a circulation flow path 23 that leads to the second reservoir tank 21 from the spindle 6 of the processing apparatus 4 are provided. On the second flow path 22, the second reservoir tank 21 of the constant temperature water supply apparatus 3, a second delivery pump (delivery pump) 24, second pressure detecting means 25, second water temperature adjusting means 26 (adjuster), and a second filter 27 are provided sequentially from the upstream side toward the downstream side. The cooling water for the processing apparatus 4 is stored in the second reservoir tank 21 and the water in the second reservoir tank 21 is sent from the second reservoir tank 21 toward the spindle 6 of the processing apparatus 4 by the second delivery pump 24.

The delivery pressure of the second delivery pump 24 is detected by the second pressure detecting means 25 and the delivery pressure of the second delivery pump 24 is adjusted according to the detection result of the second pressure detecting means 25. On the downstream side of the second delivery pump 24 on the second flow path 22, the water temperature is cooled to a predetermined temperature by second cooling means 28 such as a chiller unit in the second water temperature adjusting means 26. The water cooled to the predetermined temperature or lower passes through the second filter 27 to be supplied to the spindle 6 in the processing apparatus 4 as the cooling water. Furthermore, the water after the spindle cooling is returned to the inside of the second reservoir tank 21 through the circulation flow path 23 and is circulated between the second reservoir tank 21 and the spindle 6.

Moreover, the first system 10 is provided with a constant temperature water supply flow path 31 that branches from the first flow path 12 downstream of the first water temperature adjusting means 16 and communicates with the second reservoir tank 21, and water adjusted to the predetermined temperature is supplied from the first flow path 12 to the second reservoir tank 21 through the constant temperature water supply flow path 31. At the place of the branching from the first flow path 12 to the constant temperature water supply flow path 31, a solenoid valve 32 that switches water feed to the second reservoir tank 21 is disposed. The water in the second system 20 may be periodically replaced by connecting a water drainage to the second flow path 22 to drain part of the cooling water that circulates in the second system 20 and supplying part of the processing water of the first system 10 to the second system 20.

In the constant temperature water supply system 1 configured in this manner, the processing water whose temperature is adjusted by the constant temperature water supply apparatus 3 is supplied to the processing apparatus 4 and is injected toward a processed place from the injection nozzle 5 of a blade cover. Furthermore, the cooling water whose temperature is adjusted by the constant temperature water supply apparatus 3 is circulated between the spindle 6 of the processing apparatus 4 and the constant temperature water supply apparatus 3. Moreover, in the constant temperature water supply system 1, the system of water is divided into the first system 10 for the processing water and the second system 20 for the cooling water and thus the temperature of the processing water and the temperature of the cooling water can be individually adjusted in the first system 10 and the second system 20.

Meanwhile, in the constant temperature water supply system 1, the constant temperature water supply apparatus 3 and the processing apparatus 4 are not necessarily installed close to each other and are frequently installed at distant places different in the cleanliness. Because the constant temperature water supply apparatus 3 and the processing apparatus 4 are distant, a pipe that couples the constant temperature water supply apparatus 3 and the processing apparatus 4 is formed to be long. For this reason, water is readily affected by various external factors such as the use environment in the pipe that runs from the constant temperature water supply apparatus 3 toward the processing apparatus 4 and the water temperature often changes by several degrees or more when the water is supplied to the processing apparatus 4. It is also conceivable that the temperature change in the pipe is predicted and the temperature is adjusted in the constant temperature water supply apparatus 3. However, it is difficult to properly predict the temperature change in consideration of the external factors.

Therefore, in the present embodiment, the water temperature of the processing water immediately before supply to the injection nozzle 5 of the processing apparatus 4 is detected by first water temperature detecting means 41 (detector) and the water temperature of the cooling water immediately before supply to the spindle 6 of the processing apparatus 4 is detected by second water temperature detecting means 42 (detector). Then, the temperature differences of the detected temperatures with respect to desired temperatures in the processing apparatus 4 are fed back to the constant temperature water supply apparatus 3 and temperature adjustment is carried out again by the first and second water temperature adjusting means 16 and 26 in consideration of the temperature differences in the constant temperature water supply apparatus 3. This makes it possible to suppress variation in the water temperatures due to external factors and supply the processing water and the cooling water at the desired temperatures from the constant temperature water supply apparatus 3 to the processing apparatus 4.

In this case, in the constant temperature water supply system 1, a first water temperature managing unit (water temperature managing unit) 45 and a first temperature adjustment control unit (temperature adjustment control unit) 46 are provided as first control means 44, and a second water temperature managing unit (water temperature managing unit) 48 and a second temperature adjustment control unit (temperature adjustment control unit) 49 are provided as second control means 47. The first and second water temperature managing units 45 and 48 are each disposed in the processing apparatus 4 and the first and second temperature adjustment control units 46 and 49 are each disposed in the constant temperature water supply apparatus 3. The first and second water temperature managing units 45 and 48 of the processing apparatus 4 and the first and second temperature adjustment control units 46 and 49 of the constant temperature water supply apparatus 3 are connected to be communicable by wireless or wired communication means.

Furthermore, a desired temperature $T1a$ of the processing water is stored in the first water temperature managing unit 45 in advance. The first water temperature managing unit 45 receives a water temperature $T0a$ detected by the first water temperature detecting means 41 disposed in the processing apparatus 4 and calculates a difference $\Delta a$ between the water temperature $T0a$ and the desired temperature $T1a$ stored in advance ($\Delta a = T1a - T0a$). Information on the difference $\Delta a$ is transmitted from the first water temperature managing unit 45 to the first temperature adjustment control unit 46 by the communication means. The first temperature adjustment control unit 46 receives the information on the difference $\Delta a$ from the first water temperature managing unit 45 and adds the difference $\Delta a$ to a present predetermined temperature Ta of the first water temperature adjusting means 16 to reset the predetermined temperature Ta to the new predetermined temperature Ta.

Similarly, a desired temperature $T1b$ of the cooling water is stored in the second water temperature managing unit 48 in advance. The second water temperature managing unit 48 receives a water temperature $T0b$ detected by the second water temperature detecting means 42 disposed in the processing apparatus 4 and calculates a difference $\Delta b$ between the water temperature $T0b$ and the desired temperature $T1b$ stored in advance ($\Delta b = T1b - T0b$). Information on the difference $\Delta b$ is transmitted from the second water temperature managing unit 48 to the second temperature adjustment control unit 49 by the communication means. The second temperature adjustment control unit 49 receives the information on the difference $\Delta b$ from the second water temperature managing unit 48 and adds the difference $\Delta b$ to a present predetermined temperature Tb of the second water temperature adjusting means 26 to reset the predetermined temperature Tb to the new predetermined temperature Tb.

In this manner, the temperature differences $\Delta a$ and $\Delta b$ of the water temperatures $T0a$ and $T0b$ with respect to the desired temperatures $T1a$ and $T1b$ in the processing apparatus 4 are fed back to the constant temperature water supply apparatus 3 and the predetermined temperatures Ta and Tb are reset to the new predetermined temperatures Ta and Tb that reflect the temperature differences $\Delta a$ and $\Delta b$ in the constant temperature water supply apparatus 3. Thereby, the processing water is adjusted to the new predetermined temperature Ta in the constant temperature water supply apparatus 3 and the cooling water is adjusted to the new predetermined temperature Tb or lower. Thus, the temperature of the processing water changes to the desired temperature T1a in the pipe that runs from the constant temperature water supply apparatus 3 toward the processing apparatus 4 and the temperature of the cooling water changes to the desired temperature T1b, so that proper temperature management is enabled in the processing apparatus 4.

The first water temperature managing unit 45 and the first temperature adjustment control unit 46 of the first control means 44 and the second water temperature managing unit 48 and the second temperature adjustment control unit 49 of the second control means 47 are each formed with a processor, a memory, a transmitting/receiving circuit, and so forth that execute various kinds of processing. The memory is formed of one or plural storage media such as a read only memory (ROM) and a random access memory (RAM) according to the use purpose. In the memory, various kinds of control programs are stored besides parameters such as the desired temperatures T1a and T1b.

Figure 2:
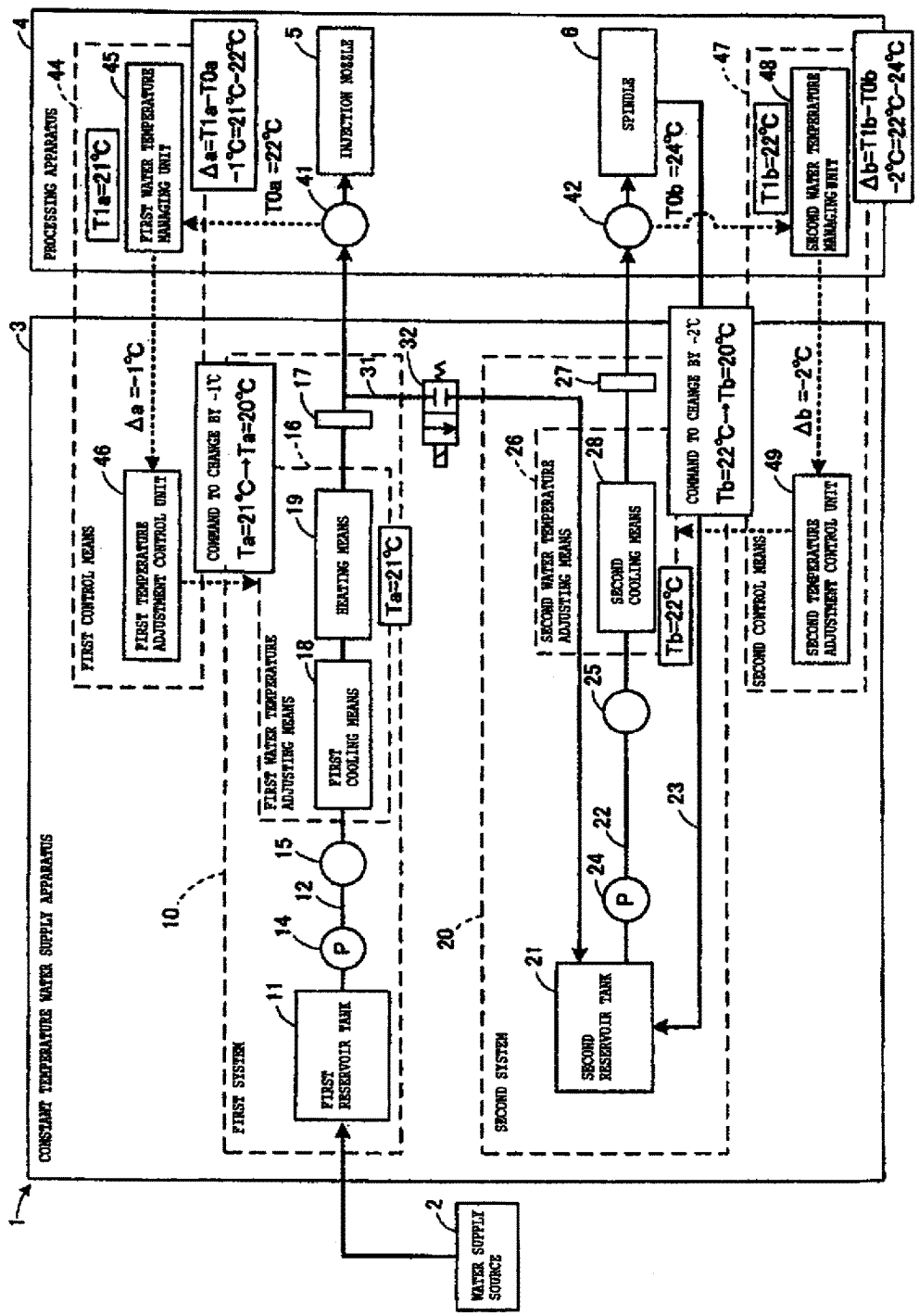
FIG. 2 is an explanatory diagram of temperature adjustment operation by the constant temperature water supply system of the present embodiment.

Temperature adjustment operation by the constant temperature water supply system will be specifically described below with reference to FIG. 2. FIG. 2 is an explanatory diagram of the temperature adjustment operation by the constant temperature water supply system of the present embodiment. In FIG. 2, the state in which water feed from the first flow path to the second reservoir tank is stopped is shown. However, water may be fed from the first flow path to the second reservoir tank.

As shown in FIG. 2, in the constant temperature water supply system 1, the constant temperature water supply apparatus 3 and the processing apparatus 4 are installed on different floors or the like and the temperature of water readily changes in the pipe that couples the apparatuses. When the processing apparatus 4 is operated in such a constant temperature water supply system 1, the processing water is sent from the first reservoir tank 11 by the first delivery pump 14. The predetermined temperature Ta (for example, 21° C.) is set in the first water temperature adjusting means 16 and the processing water is adjusted to the predetermined temperature Ta in the first water temperature adjusting means 16. The processing water after the temperature adjustment is injected from the injection nozzle 5 of the processing apparatus 4 toward a processing point and is discharged to the outside through the water case or the like of the processing apparatus 4.

At this time, the first water temperature detecting means 41 is disposed in the pipe in front of the injection nozzle 5 of the processing apparatus 4 and the water temperature T0a of the processing water immediately before injection from the injection nozzle 5 (for example, 22° C.) is detected by the first water temperature detecting means 41. The water temperature T0a of the processing water has changed from the predetermined temperature Ta in the pipe due to external factors and so forth. Then, the water temperature T0a is output from the first water temperature detecting means 41 to the first water temperature managing unit 45 and the difference Δa (−1° C.) between the desired temperature T1a (for example, 21° C.) and the water temperature T0a (22° C.) is calculated by the first water temperature managing unit 45. The difference Δa is transmitted to the first temperature adjustment control unit 46 and a command to change the predetermined temperature Ta is generated based on the difference Δa in the first temperature adjustment control unit 46.

The change command to add the difference Δa (−1° C.) to the present predetermined temperature Ta (21° C.) is generated in the first temperature adjustment control unit 46 and the new predetermined temperature Ta (20° C.) is set based on the change command from the first temperature adjustment control unit 46 in the first water temperature adjusting means 16. The temperature of the processing water after the temperature adjustment changes in the pipe toward the processing apparatus 4 due to external factors and so forth but is adjusted to the desired temperature T1a (21° C.) due to the temperature change in the pipe. In this manner, the temperature of the processing water is adjusted in consideration of temperature change due to external factors in the constant temperature water supply apparatus 3 and the processing water whose temperature has become the desired temperature is injected from the injection nozzle 5 in the processing apparatus 4.

Furthermore, in the constant temperature water supply system 1, the processing water is periodically supplied from the first flow path 12 to the second reservoir tank 21 through the constant temperature water supply flow path 31 and is stored by the second reservoir tank 21 as the cooling water. When the processing apparatus 4 is operating, the cooling water is sent from the second reservoir tank 21 by the second delivery pump 24. The predetermined temperature Tb (for example, 22° C.) is set in the second water temperature adjusting means 26 and the cooling water is adjusted to the predetermined temperature Tb or lower in the second water temperature adjusting means 26. The cooling water after the temperature adjustment is supplied to the spindle 6 of the processing apparatus 4 and furthermore is returned to the second reservoir tank 21 through the circulation flow path 23.

At this time, the second water temperature detecting means 42 is disposed in the pipe in front of the spindle 6 of the processing apparatus 4 and the water temperature T0b of the cooling water immediately before supply to the spindle 6 (for example, 24° C.) is detected by the second water temperature detecting means 42. The water temperature T0b of the cooling water has changed from the predetermined temperature Tb in the pipe due to external factors and so forth. Then, the water temperature T0b is output from the second water temperature detecting means 42 to the second water temperature managing unit 48 and the difference Δb (−2° C.) between the desired temperature T1b (for example, 22° C.) and the water temperature T0b (24° C.) is calculated by the second water temperature managing unit 48. The difference Δb is transmitted to the second temperature adjustment control unit 49 and a command to change the predetermined temperature Tb is generated based on the difference Δb in the second temperature adjustment control unit 49.

The change command to add the difference Δb (−2° C.) to the present predetermined temperature Tb (22° C.) is generated in the second temperature adjustment control unit 49 and the new predetermined temperature Tb (20° C.) is set based on the change command from the second temperature adjustment control unit 49 in the second water temperature adjusting means 26. The temperature of the cooling water after the temperature adjustment changes in the pipe toward the processing apparatus 4 due to external factors and so forth but is adjusted to the desired temperature T1b (22° C.) or lower due to the temperature change in the pipe. In this manner, the temperature of the cooling water is adjusted in consideration of temperature change due to external factors in the constant temperature water supply apparatus 3 and the spindle is cooled by the water whose temperature has become the desired temperature or lower in the processing apparatus 4.

It suffices for the cooling water to be capable of cooling the spindle shaft. Advanced temperature adjustment like that for the processing water is unnecessary and it suffices that the water temperature is at least adjusted to the desired temperature T1b or lower. Therefore, resetting of the predetermined temperature Tb is necessary in the constant temperature water supply apparatus 3 only when the water temperature T0b of the cooling water in the processing apparatus 4 is higher than the desired temperature T1b. The predetermined temperature Tb does not need to be reset in the constant temperature water supply apparatus 3 when the water temperature T0b of the cooling water in the processing apparatus 4 is equal to or lower than the desired temperature T1b. Thus, various kinds of calculation processing and control processing in the second water temperature managing unit 48 and the second temperature adjustment control unit 49 are omitted.

As described above, in the constant temperature water supply system 1 of the present embodiment, the temperature difference between the water temperature detected in the processing apparatus 4 and the desired temperature is fed back to the constant temperature water supply apparatus 3 and the predetermined temperature that reflects the temperature difference is reset in the constant temperature water supply apparatus 3. Specifically, the setting error of the predetermined temperature in the use environment in which the constant temperature water supply apparatus 3 is installed is corrected based on the temperature difference between the water temperature detected in the use environment in which the processing apparatus 4 is installed and the desired temperature. The water temperature is adjusted to the predetermined temperature after this resetting in the constant temperature water supply apparatus and thereby the water temperature changes from the predetermined temperature to the desired temperature of the processing apparatus 4 while the water is supplied from the constant temperature water supply apparatus 3 to the processing apparatus 4. Thus, the water at the desired temperature can be supplied to the processing apparatus 4 even when the water temperature changes due to external factors and so forth while the water is supplied from the constant temperature water supply apparatus 3 to the processing apparatus 4.

The present invention is not limited to the above-described embodiment and can be carried out with various changes. In the above-described embodiment, sizes, shapes, and so forth diagrammatically represented in the accompanying drawings are not limited thereto and can be changed as appropriate in such a range as to exert effects of the present invention. Besides, the embodiment can be carried out with changes as appropriate without departing from the scope of the object of the present invention.

Figure 3:
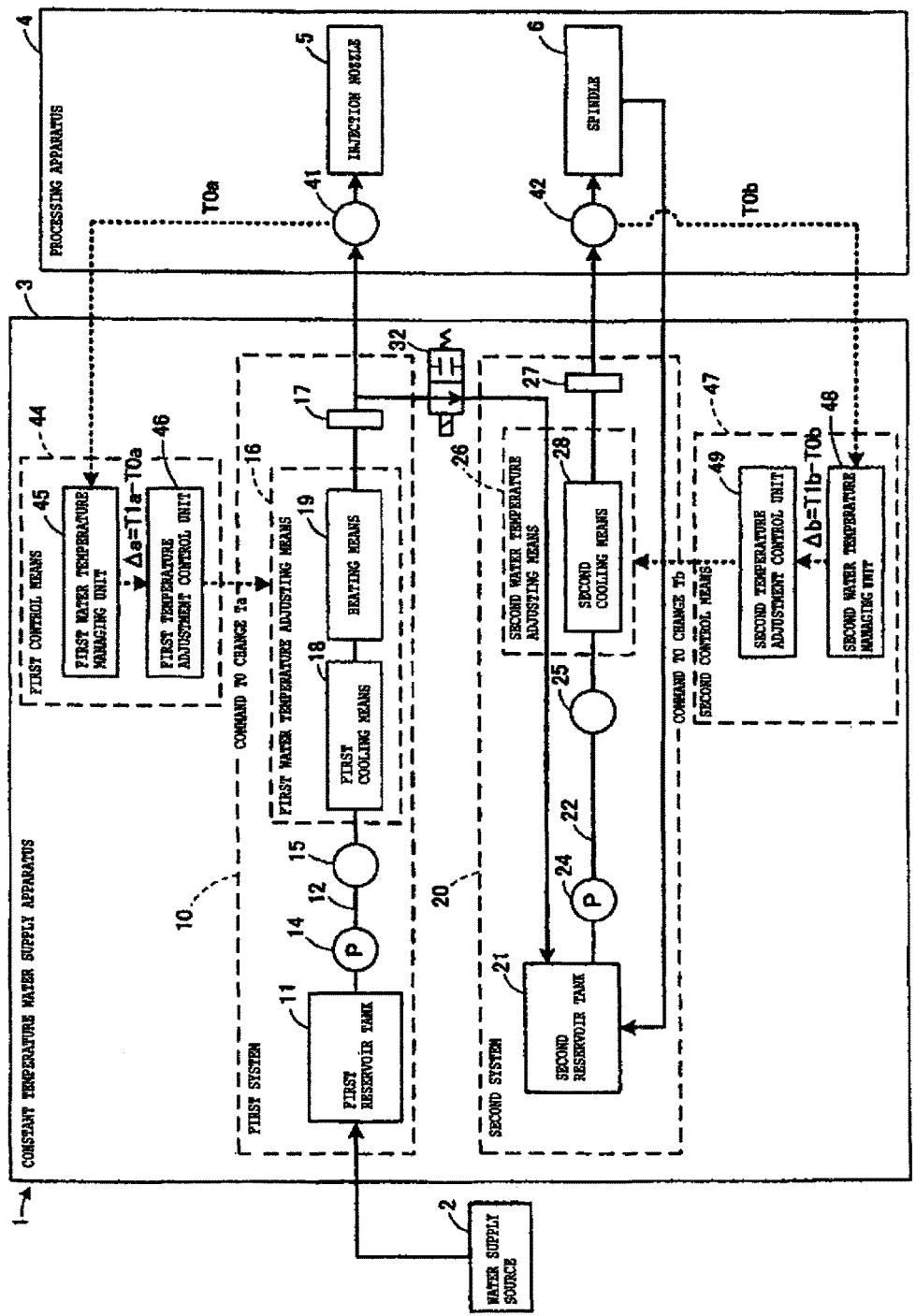
FIG. 3 is an explanatory diagram of temperature adjustment operation by a constant temperature water supply system of a modification example.

For example, in the above-described embodiment, the configuration is employed in which the first and second water temperature managing units 45 and 48 are disposed in the processing apparatus 4 and the first and second temperature adjustment control units 46 and 49 are disposed in the constant temperature water supply apparatus 3. However, the present invention is not limited to this configuration. For example, as shown in FIG. 3, the first and second water temperature managing units 45 and 48 may be disposed in the constant temperature water supply apparatus 3. A constant temperature water supply system of a modification example will be simply described below with reference to FIG. 3. In the modification example, the description will be made in such a manner that a configuration similar to that of the present embodiment is omitted as much as possible and the same name as the present embodiment is given the same numeral.

As shown in FIG. 3, in the constant temperature water supply system 1 of the modification example, when the water temperature T0a is detected in the first water temperature detecting means 41 in the processing apparatus 4, the water temperature T0a is transmitted from the first water temperature detecting means 41 to the first water temperature managing unit 45 in the constant temperature water supply apparatus 3 by the wireless or wired communication means. The difference Δa between the water temperature T0a in the processing apparatus 4 and the desired temperature T1a is calculated in the first water temperature managing unit 45 and the predetermined temperature Ta of the first water temperature adjusting means 16 is reset based on the difference Δa by the first temperature adjustment control unit 46. Thereby, the temperature of the processing water is adjusted in the constant temperature water supply apparatus 3 and the processing water whose temperature has become the desired temperature is injected from the injection nozzle 5 in the processing apparatus 4.

When the water temperature T0b is detected in the second water temperature detecting means 42 in the processing apparatus 4, the water temperature T0b is transmitted from the second water temperature detecting means 42 to the second water temperature managing unit 48 in the constant temperature water supply apparatus 3 by the wireless or wired communication means. The difference Δb between the water temperature T0b in the processing apparatus 4 and the desired temperature T1b is calculated in the second water temperature managing unit 48 and the predetermined temperature Tb of the second water temperature adjusting means 26 is reset based on the difference Δb by the second temperature adjustment control unit 49. Thereby, the temperature of the cooling water is adjusted in the constant temperature water supply apparatus 3 and the cooling water whose temperature has become the desired temperature is supplied to the spindle 6 in the processing apparatus 4. Thus, the same effects as the present embodiment can be achieved also in the constant temperature water supply system 1 of the modification example.

Furthermore, a configuration in which the first and second temperature adjustment control units 46 and 49 are disposed in the processing apparatus 4 may be employed. In this case, temperature adjustment of the processing water and the cooling water by the first and second water temperature adjusting means 16 and 26 of the constant temperature water supply apparatus 3 is controlled by the first and second temperature adjustment control units 46 and 49 in the processing apparatus 4 through the wireless or wired communication means. Specifically, change commands are transmitted from the processing apparatus 4 to the constant temperature water supply apparatus 3 and the predetermined temperatures Ta and Tb of the first and second water temperature adjusting means 16 and 26 of the constant temperature water supply apparatus 3 are reset based on the change commands. Also with such a configuration, the same effects as the present embodiment can be achieved.

Moreover, the first and second water temperature managing units 45 and 48 and the first and second temperature adjustment control units 46 and 49 are not limited to the configuration in which they are disposed in the constant temperature water supply apparatus 3 or the processing apparatus 4, and may be disposed in external apparatus connected to the constant temperature water supply apparatus 3 or the processing apparatus 4 by wireless or wired communication means.

Furthermore, in the above-described embodiment, the configuration in which the processing water is supplied from the first flow path 12 of the first system 10 to the second reservoir tank 21 of the second system 20 is employed. However, the present invention is not limited to this configuration. The first system 10 and the second system 20 may be completely separated and the supply sources of the processing water and the cooling water may be different. For example, purified water or the like from the water supply source 2 may be used as the processing water for the first system 10 and tap water from a water supply or the like may be used as the cooling water in the second system 20.

Moreover, in the above-described embodiment, the configuration is employed in which the water temperature of the processing water immediately before injection from the injection nozzle 5 is detected by the first water temperature detecting means 41. However, the present invention is not limited to this configuration. It suffices for the first water temperature detecting means 41 to detect the water temperature of the processing water in a pipe of the processing apparatus 4. In addition, although the configuration is employed in which the water temperature of the cooling water immediately before supply to the spindle 6 is detected by the second water temperature detecting means 42, the present invention is not limited to this configuration. It suffices for the second water temperature detecting means 42 to detect the water temperature of the cooling water in a pipe of the processing apparatus 4.

Furthermore, in the above-described embodiment, the configuration in which the cooling water is supplied to the spindle 6 is employed. However, the present invention is not limited to this configuration. It suffices for the cooling water to be supplied to a place for which cooling is necessary in the processing apparatus 4. For example, the cooling water may be supplied to a cooling flow path in the chuck table.

As described above, the present invention has an effect that variation in the water temperature due to external factors can be suppressed and water at a desired temperature can be supplied to processing apparatus and particularly is useful for a constant temperature water supply system that supplies processing water and cooling water to processing apparatus such as cutting apparatus or grinding apparatus.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A constant temperature water supply system comprising:
   constant temperature water supply apparatus that adjusts water supplied from a water supply source to a predetermined temperature and supplies the water;
   a processing apparatus that uses the water supplied from the constant temperature water supply apparatus; and
   control means for controlling the constant temperature water supply apparatus in such a manner that temperature of the water to be used in the processing apparatus becomes a desired temperature,
   wherein the constant temperature water supply apparatus includes:
     a reservoir tank that stores the water that is supplied from the water supply source and is to be used in the processing apparatus,
     a delivery pump that is disposed on a flow path that leads to the processing apparatus from the reservoir tank and sends the water to the processing apparatus, and
     water temperature adjusting means disposed downstream relative to the delivery pump on the flow path for adjusting water temperature to a predetermined temperature T,
   wherein the processing apparatus includes a water temperature detector that is configured and arranged to detect the water temperature of the water supplied into the processing apparatus,
   wherein the control means includes:
     a water temperature managing unit that receives a water temperature T0 detected by the water temperature detector in the processing apparatus and calculates a difference $\Delta = T1 - T0$ from a desired temperature T1 stored in advance, and
     a temperature adjustment control unit that receives information on the difference $\Delta$ calculated in the water temperature managing unit and adds the difference $\Delta$ to the predetermined temperature T of the water temperature adjusting means of the constant temperature water supply apparatus to reset the predetermined temperature T, and
   wherein the water is supplied into the processing apparatus at the desired temperature.

2. The constant temperature water supply system according to claim 1,
   wherein the water temperature managing unit of the control means is disposed in the processing apparatus and the information on the difference $\Delta$ is transmitted from the water temperature managing unit to the temperature adjustment control unit of the constant temperature water supply apparatus by wireless or wired communication means.

3. The constant temperature water supply system according to claim 1,
   wherein the water temperature managing unit of the control means is disposed in the constant temperature water supply apparatus and information on the water temperature T0 is transmitted from the water temperature detector in the processing apparatus to the water temperature managing unit in the constant temperature water supply apparatus by wireless or wired communication means.

4. The constant temperature water supply system according to claim 1, wherein said water temperature adjusting means comprises a chiller unit and a heater.

5. A constant temperature water supply system comprising:
   constant temperature water supply apparatus that adjusts water supplied from a water supply source to a predetermined temperature and supplies the water;
   a grinding apparatus that uses the water supplied from the constant temperature water supply apparatus; and
   control means for controlling the constant temperature water supply apparatus in such a manner that temperature of the water to be used in the grinding apparatus becomes a desired temperature,
   wherein the constant temperature water supply apparatus includes:
     a reservoir tank that stores the water that is supplied from the water supply source and is to be used in the grinding apparatus, a delivery pump that is disposed on a flow path that leads to the grinding apparatus from the reservoir tank and sends the water to the grinding apparatus, and a water temperature adjuster disposed downstream relative to the delivery pump on the flow path configured and arranged to adjust water temperature to a predetermined temperature T, wherein the grinding apparatus includes a water temperature detector that is configured and arranged to detect the water temperature of the water supplied into the grinding apparatus, wherein the control means includes:

a water temperature managing unit that receives a water temperature T0 detected by the water temperature detector in the grinding apparatus and calculates a difference $\Delta=T1-T0$ from a desired temperature T1 stored in advance, and a temperature adjustment control unit that receives information on the difference $\Delta$ calculated in the water temperature managing unit and adds the difference $\Delta$ to the predetermined temperature T of the water temperature adjuster of the constant temperature water supply apparatus to reset the predetermined temperature T, and wherein the water is supplied into the grinding apparatus at the desired temperature.

6. The constant temperature water supply system according to claim 5, wherein the water temperature managing unit of the control means is disposed in the grinding apparatus and the information on the difference $\Delta$ is transmitted from the water temperature managing unit to the temperature adjustment control unit of the constant temperature water supply apparatus by wireless or wired communication means.

7. The constant temperature water supply system according to claim 5, wherein the water temperature managing unit of the control means is disposed in the constant temperature water supply apparatus and information on the water temperature T0 is transmitted from the water temperature detector in the grinding apparatus to the water temperature managing unit in the constant temperature water supply apparatus by wireless or wired communication means.

8. The constant temperature water supply system according to claim 5, wherein said water temperature adjuster means comprises a chiller unit and a heater.

9. A constant temperature water supply system comprising:

constant temperature water supply apparatus that adjusts water supplied from a water supply source to a predetermined temperature and supplies the water;

a cutting apparatus that uses the water supplied from the constant temperature water supply apparatus; and control means for controlling the constant temperature water supply apparatus in such a manner that temperature of the water to be used in the cutting apparatus becomes a desired temperature, wherein the constant temperature water supply apparatus includes:

a reservoir tank that stores the water that is supplied from the water supply source and is to be used in the cutting apparatus, a delivery pump that is disposed on a flow path that leads to the cutting apparatus from the reservoir tank and sends the water to the cutting apparatus, and a water temperature adjuster disposed downstream relative to the delivery pump on the flow path configured and arranged to adjust water temperature to a predetermined temperature T, wherein the cutting apparatus includes a water temperature detector that is configured and arranged to detect the water temperature of the water supplied into the cutting apparatus, wherein the control means includes:

a water temperature managing unit that receives a water temperature T0 detected by the water temperature detector in the cutting apparatus and calculates a difference $\Delta=T1-T0$ from a desired temperature T1 stored in advance, and a temperature adjustment control unit that receives information on the difference $\Delta$ calculated in the water temperature managing unit and adds the difference $\Delta$ to the predetermined temperature T of the water temperature adjuster of the constant temperature water supply apparatus to reset the predetermined temperature T, and wherein the water is supplied into the cutting apparatus at the desired temperature.

10. The constant temperature water supply system according to claim 9, wherein the water temperature managing unit of the control means is disposed in the cutting apparatus and the information on the difference $\Delta$ is transmitted from the water temperature managing unit to the temperature adjustment control unit of the constant temperature water supply apparatus by wireless or wired communication means.

11. The constant temperature water supply system according to claim 9, wherein the water temperature managing unit of the control means is disposed in the constant temperature water supply apparatus and information on the water temperature T0 is transmitted from the water temperature detector in the cutting apparatus to the water temperature managing unit in the constant temperature water supply apparatus by wireless or wired communication means.

12. The constant temperature water supply system according to claim 9, wherein said water temperature adjuster comprises a chiller unit and a heater.

* * * * *